(12) United States Patent
Wood et al.

(10) Patent No.: US 9,094,590 B2
(45) Date of Patent: Jul. 28, 2015

(54) CAMERA SUPPORTING ASSEMBLY INCLUDING ANGULARLY ADJUSTABLE WHEELS

(71) Applicant: Dennis Wood, Thunder Bay (CA)

(72) Inventors: Dennis Wood, Thunder Bay (CA); Tyler J. F. Bragnalo, Thunder Bay (CA)

( * ) Notice: Subject to any disclaimer, the term of this patent is extended or adjusted under 35 U.S.C. 154(b) by 56 days.

(21) Appl. No.: 14/093,264

(22) Filed: Nov. 29, 2013

(65) Prior Publication Data

US 2015/0156378 A1 Jun. 4, 2015

(51) Int. Cl.
 *F16M 11/42* (2006.01)
 *H04N 5/225* (2006.01)
(52) U.S. Cl.
 CPC .................................. *H04N 5/2251* (2013.01)
(58) Field of Classification Search
 CPC . F16M 11/425; F16M 11/42; F16M 11/2064; G03B 17/561; G08B 13/19623; G08B 13/19632; G08B 13/1963; B66D 3/04
 USPC .............. 352/243, 34; 396/9, 12, 17, 13, 419, 396/427; 348/143–147, 157, 159; 248/317, 248/323, 328, 329
 See application file for complete search history.

(56) References Cited

U.S. PATENT DOCUMENTS

| | | | | |
|---|---|---|---|---|
| 4,699,484 A | * | 10/1987 | Howell et al. | 352/243 |
| 5,711,227 A | * | 1/1998 | Johnson | 104/126 |
| 6,264,330 B1 | * | 7/2001 | Walton et al. | 352/243 |
| 8,142,019 B2 | * | 3/2012 | Hernandez | 352/243 |
| 2008/0315542 A1 | * | 12/2008 | Fisher | 280/86 |
| 2009/0212194 A1 | * | 8/2009 | Wood | 248/647 |

* cited by examiner

*Primary Examiner* — William C Dowling
(74) *Attorney, Agent, or Firm* — Ryan W. Dupuis; Kyle R. Satterthwaite; Ade & Company Inc (57) ABSTRACT

A camera supporting assembly includes a frame supporting interchangeable camera mounts thereon to support smartphones, and other camera enabled devices interchangeably thereon. A grip member with a first pivot coupling selectively couples to a second pivot coupling on the frame and a pair of stabilizer legs are suspended below the frame so as to balance the camera on the grip member. Wheel assemblies are selectively mounted on the stabilizer legs for alternate use in a portable dolly mode. Each wheel assembly is mounted by a spindle which is movable between different mounted positions corresponding to different angular orientation of the wheel axis relative to the frame to controllably steer movement of a camera supported on the assembly in the dolly mode without a track necessarily being provided.

20 Claims, 9 Drawing Sheets

CAMERA SUPPORTING ASSEMBLY INCLUDING ANGULARLY ADJUSTABLE WHEELS

FIELD OF THE INVENTION

The present invention relates to a camera supporting assembly including a plurality of wheels for rolling movement along a supporting surface to provide the function of a camera dolly in which at least one of the wheels has an axis of rotation which is angularly adjustable to steer the dolly along a prescribed path, and more particularly the present invention relates to a camera supporting assembly having stabilizer legs for counterbalancing a camera device about a pivotal connection in which the dolly wheels are arranged to be coupled to the stabilizer legs.

BACKGROUND

The use of camera dollies is well known for capturing various video sequences, for example a panning shot. Typical camera dollies are provided with freely pivotal casters movable along a track if a prescribed path is desired; otherwise, a more complex active steering mechanism would be required. No simple mechanism is known for guiding camera dollies along a prescribe path without a track necessarily being required.

Furthermore, known camera dollies are not well suited for use with smaller camera devices, for example point-and-shoot cameras or camera enabled mobile phones such as smartphones, and the like.

For other shots, use of camera stabilizers are known. Stabilizers generally comprise a grip portion held in hand of user, a camera support upon which the camera is mounted, a balancing pivotal connection between the camera support and the grip portion, and a stabilizer portion on the camera support which extends below the pivotal connection to counterbalance the camera about the pivotal connection. If a user desires one video sequence to be shot with a camera dolly and another video sequence to be shot with a camera stabilizer, the user must typically acquire to separate pieces of equipment.

SUMMARY OF THE INVENTION

According to one aspect of the invention there is provided a camera supporting assembly for supporting a camera device for rolling movement along a supporting surface, the camera supporting assembly comprising:

a frame;

a camera mount supported on the frame and arranged to support the camera device thereon;

a plurality of wheel assemblies supported on the frame below the camera mount, each wheel assembly comprising:

a spindle mounted on the frame and defining a wheel axis; and a wheel supported on the spindle rotatably about the wheel axis so as to be so as to be arranged for rolling movement along the supporting surface;

wherein at least one of the wheel assemblies comprises an adjustable assembly in which the spindle is movable relative to the frame between a plurality of different mounted positions, each corresponding to a different angular orientation of the wheel axis relative to the frame.

The use of wheel assemblies which can be supported in different angular orientations of the wheel axes provides a simple mechanism which can controllably steer the resulting camera dolly structure along a straight or curved prescribed path. The camera can thus be guided through a dolly shot in a repetitive and predictable manner as desired when filming multiple takes of a video sequence.

Preferably each of the wheel assemblies comprises an adjustable assembly in which the spindle thereof is movable relative to the frame between a plurality of different mounted positions having different angular orientations of the wheel axis thereof relative to the frame.

Preferably the wheels are oriented for rolling movement generally in a panning direction relative to the camera device.

In one embodiment the camera device supported on the camera mount may comprise a camera enabled mobile phone; however, other types of camera mounts can be used for supporting various additional camera enabled devices and configurations.

Preferably the spindle of the adjustable assembly of said at least one of the wheel assemblies is rotatable relative to the frame between the different mounted positions about a respective adjustment axis which is transverse to the respective wheel axis.

Preferably co-operating indexing markings are provided on the frame and on said at least one wheel assembly which are arranged to be aligned with one another in each of the different mounted positions.

When a plurality of the wheel assemblies comprise adjustable wheel assemblies and each is rotatable relative to the frame between respective different mounted positions about a respective adjustment axis which is transverse to the respective wheel axis, preferably the adjustment axes are parallel to one another.

The camera supporting assembly may further comprise: i) a grip member including a handle arranged to be gripped in a hand of a user and a first pivot coupling, ii) a second pivot coupling supported on the frame and arranged to be pivotally coupled to the first pivot coupling on the grip member so as to define a pivotal connection between the first and second pivot couplings, and iii) at least one leg assembly mounted on the frame to extend downwardly below the second pivot coupling of the frame so as to be arranged to counterbalance a camera device supported on the camera mount about said pivotal connection, in which the wheel assemblies are mounted on said at least one leg assembly.

When the frame comprises a pair of leg assemblies extending downwardly from the camera mount, preferably each leg assembly supports a pair of the wheel assemblies thereon.

When each of the leg assemblies includes an upper portion and a lower portion which is pivotally foldable relative to the upper portion between a folded storage position adjacent the upper portion and an extended working position extending downwardly from the upper portion, preferably a stop member prevents pivoting movement of the lower portion relative to the upper portion beyond the extended working position from the folded storage position.

A pair of foot portions may be supported at a bottom end of each leg assembly at opposing sides of the leg assembly in which the pair of wheel assemblies are supported on the pair of foot portions respectively.

When the foot portions are pivotal relative to the leg assembly between a storage position adjacent one another and a working position extending outwardly in opposing directions from the opposing sides of the leg assembly, preferably a stop member prevents pivoting movement of each foot portion relative to the leg assembly beyond the working position from the storage position.

The camera supporting assembly may further comprise: i) a grip member including a handle arranged to be gripped in a hand of a user and a first pivot coupling, and ii) a second pivot coupling supported on the frame and arranged to be pivotally coupled to the first pivot coupling on the grip member so as to define a pivotal connection between the first and second pivot couplings. In this instance, preferably the pair of leg assemblies supporting the wheel assemblies thereon are mounted on the frame to extend downwardly below the second pivot coupling of the frame so as to be arranged to counterbalance a camera device supported on the camera mount about said pivotal connection.

The wheel assemblies may be readily separable from the leg assemblies such that the camera supporting assembly may further comprise a plurality of stabilizer weights which are arranged to be mounted on the frame interchangeably with the wheel assemblies.

Each of the wheels may include a groove extending about a periphery thereof which arranged to mate with a respective one of a pair of track members.

According to a second aspect of the invention there is provided a camera supporting assembly for balancing a camera thereon, the camera supporting assembly comprising:

a frame;

a camera mount supported on the frame and arranged to support the camera device thereon;

a grip member including a handle arranged to be gripped in a hand of a user and a first pivot coupling;

a second pivot coupling supported on the frame and arranged to be pivotally coupled to the first pivot coupling on the grip member so as to define a pivotal connection between the first and second pivot couplings;

at least one stabilizer leg assembly mounted on the frame to extend downwardly below the second pivot coupling of the frame so as to be arranged to counterbalance a camera device supported on the camera mount about said pivotal connection;

a plurality of wheel assemblies supported on said at least one stabilizer leg assembly of the frame, each wheel assembly comprising a wheel supported on the stabilizer leg assembly of the frame for rotation about a respective wheel axle so as to be so as to be arranged for rolling movement along a supporting surface.

By providing wheel assemblies which can be supported on the stabilizer legs of a camera stabilizer type camera supporting assembly, the camera supporting assembly provides the dual function of a camera stabilizer and a camera dolly in a single device.

According to a third aspect of the present invention there is provided a camera supporting assembly for balancing a camera thereon, the camera supporting assembly comprising:

a frame;

a camera mount supported on the frame and arranged to support the camera device thereon;

a grip member including a handle arranged to be gripped in a hand of a user and a first pivot coupling;

a second pivot coupling supported on the frame and arranged to be pivotally coupled to the first pivot coupling on the grip member so as to define a pivotal connection between the first and second pivot couplings; and at least one stabilizer leg assembly mounted on the frame to extend downwardly below the second pivot coupling of the frame so as to be arranged to counterbalance a camera device supported on the camera mount about said pivotal connection;

wherein the camera mount is readily separable from the frame; and wherein the camera supporting assembly further comprises an auxiliary mount which is arranged to be mounted on the frame interchangeably with the camera mount;

one of the auxiliary mount and the camera mount being arranged to support a camera enabled smartphone thereon and another one of the auxiliary mount and the camera mount being arranged to support a different configuration of camera device thereon.

Preferably the frame includes a first mating component thereon and both the camera mount and the auxiliary mount include a respective second mating component thereon in which each second mating component is arranged to mate with the first mating component so that the corresponding mount is linearly slidable relative to the frame for attachment and removal of the mount from the frame respectively.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Referring to the accompanying figures, there is illustrated a camera supporting assembly generally indicated by reference numeral 10. The camera supporting assembly 10 provides the function of a dolly in a dolly mode of operation as well as the function of a camera stabilizer in a second stabilizer mode of operation.

In the primary mode of functioning is a dolly, the assembly 10 is suited for performing various dolly shots, for example a panning movement, with a small handheld camera device such as a mobile phone enabled with a camera, a point and shoot camera or other similar camera devices. The assembly 10 can also be scaled for larger video cameras in other embodiments however.

The camera supporting assembly 10 generally includes a frame 12 including a mounting channel 14 extending in a lateral direction along the top side thereof. The channel includes a base and two side walls which extend upwardly from opposing sides of the base to taper inwardly towards one another to define a generally trapezoidal cross section of the channel. The channel defines a first mating component which is used as described in further detail below.

The assembly 10 further includes a camera mount 16 which according to the illustrated embodiment is suited for supporting a mobile phone. The camera mount comprises two clamp members 18 mounted at laterally opposing ends of the mounting channel of the frame for being clamped against opposing side edges of the phone.

Each clamp member 18 includes a lower portion 20 comprising an elongate rib 21 integrally formed thereon. The rib 21 has a suitable cross section for mating with the mounting channel so as to be relatively slidable in the lateral direction in relation thereto. The rib thus defines a second mating component which is laterally slidable with the first mating component on the frame. More particularly, the rib includes a base wall and two side walls which extend upwardly from opposing sides of the base wall to taper inwardly towards one another to define a generally trapezoidal cross section of the rib 21.

Each clamp member also includes an upper portion 22 extending perpendicularly upward from the outer end of the lower portion 20 so that when the two lower portions are received in opposing ends of the mounting channel 14 the two upper portions extend upwardly from laterally opposed ends of the frame to receive the phone therebetween.

Each upper portion 22 includes a track extending vertically along an inner side thereof upon which a lower grip member 26 and an upper grip member 28 are slidably mounted. Each lower grip member 26 includes a slide portion which mates with the cross section of the track 24 for sliding therealong and a cradle portion arranged to receive the bottom edge of the phone therein. Each upper grip member 28 similarly includes a slide portion and a cradle portion however the cradle portion is instead oriented to receive an upright edge of the phone therein.

Suitable set screws 30 selectively retain the two clamp members 18 positioned relative to one another within the respective mounting channel 14 corresponding to the appropriate spacing between the grip members to receive a camera enabled mobile phone or other camera device clamped therein.

Typically, the camera device is clamped between the two clamp members 18 such that the lens of the camera is oriented in a lens direction which is perpendicular to the lateral direction of the frame.

The camera mount 16 is further arranged such that releasing the set screws permits the two clamp members to be readily slidable along the linear sliding axis of the first and second mating components for removal and subsequent reattachment as may be desired.

In further embodiments, auxiliary amounts may be provided having a similar elongate rib portion defining a second mating component for mating slidably with the first mating component of the frame in which the auxiliary mounts have different configurations relative to one another for mounting different configurations of camera devices thereon. In the instance of a point-and-shoot camera, a standard camera stud is provided on the body of the auxiliary mount to protrude upwardly from the frame 12 for threaded connection with a conventional point-and-shoot camera socket for example. Other suitable mounting hardware may be provided in place of the stud for releaseably connecting other forms of camera devices thereon.

The frame 12 in each instance generally comprises two leg assemblies 32 extending downwardly below the mounting channel 14. Each leg assembly includes an upper portion 34 in fixed relation to the mounting channel and a lower portion 36 which is hinged and foldable relative to the upper portion. The two upper portions extend downwardly in opposing lateral directions from the mounting channel to respective bottom ends pivotally coupled to the lower portions respectively.

Each lower portion is pivotal relative to the respective upper portion from a folded storage position generally adjacent or alongside the respective upper portion to an extended working position in which the lower portions extend downwardly and laterally outward to respective bottom ends thereof. A stop member 38 is integrally formed on one or both of the upper and lower portions of each leg assembly to engage the other portion as the lower portion is pivoted from the storage position towards the working position to prevent further pivoting of the lower portion beyond the working position.

Two foot portions 40 are mounted on the bottom end of each leg assembly. Each of the foot portions is pivotally supported on the leg assembly at an inner end for pivotal movement about an axis oriented in the lateral direction in the working position of the leg assemblies. The foot portions extend radially outwardly from the respective inner ends such that in the working positions thereof, the foot portions extend outwardly from opposing sides of the respective leg assembly along respective axes oriented generally in the direction of the camera lens so as to be perpendicular to the lateral direction of the frame.

The foot portions are pivotal from the working position to a storage position by folding the outer ends of the foot portions generally towards one another so that the outer ends are closer to one another in the storage position than in the working position. Each foot portion is also provided with a stop member 42 arranged to engage the respective leg assembly as the foot portion is pivoted from the storage position to the working position to prevent further pivotal movement beyond the working position.

Figure 2:
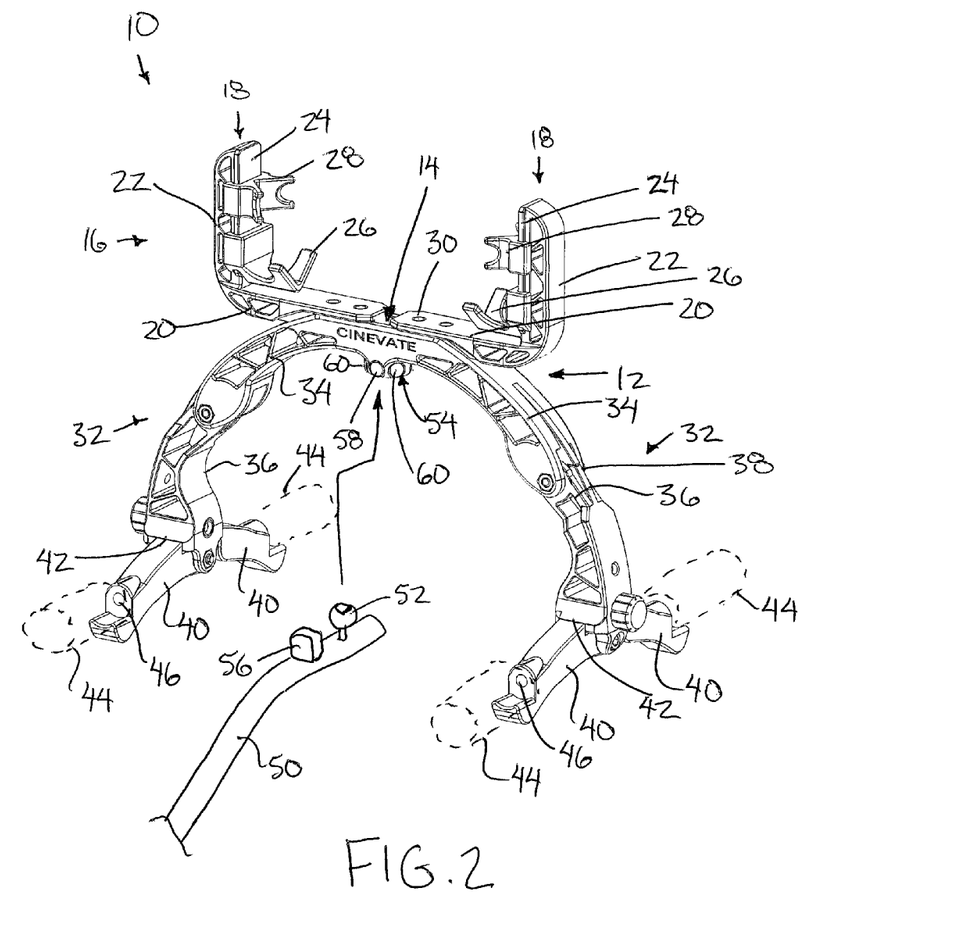
FIG. 2 is a perspective view of the camera supporting assembly of FIG. 1 in a stabilizer mode of operation.
Figure 3:
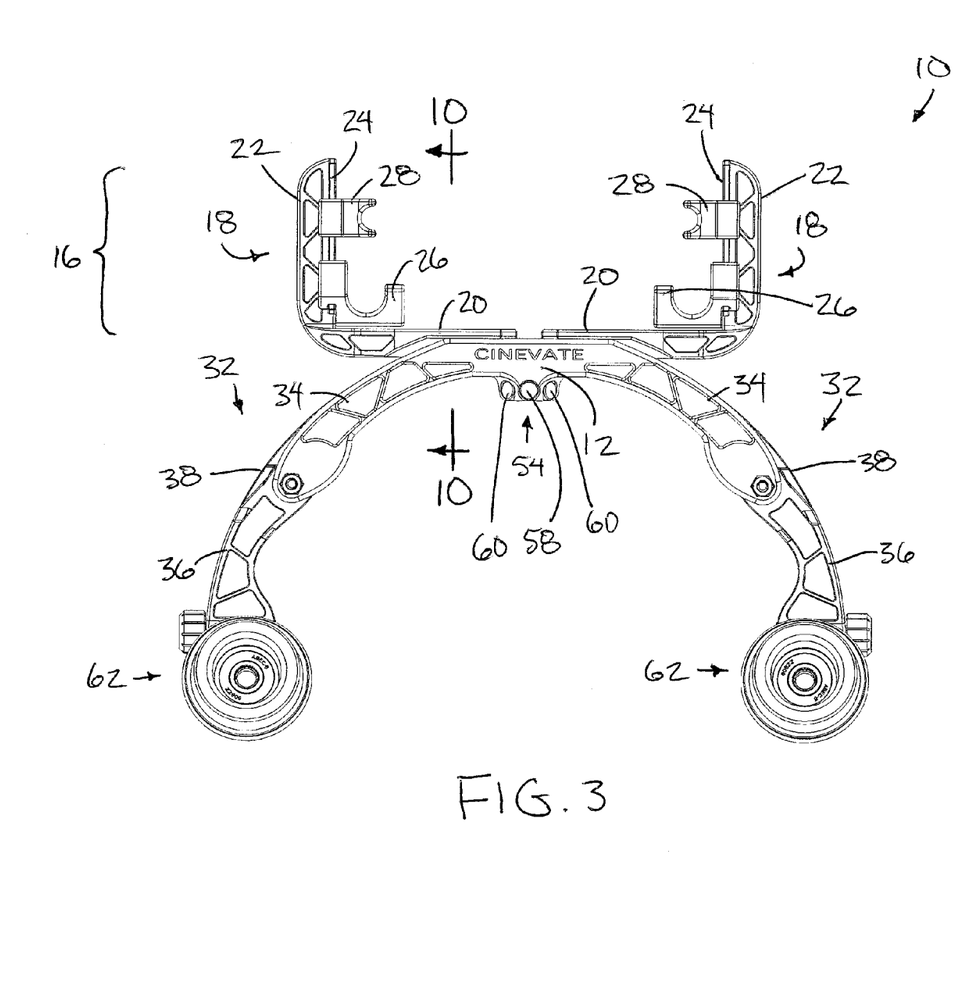
FIG. 3 is a side view of the camera supporting assembly in the dolly mode.
Figure 4:
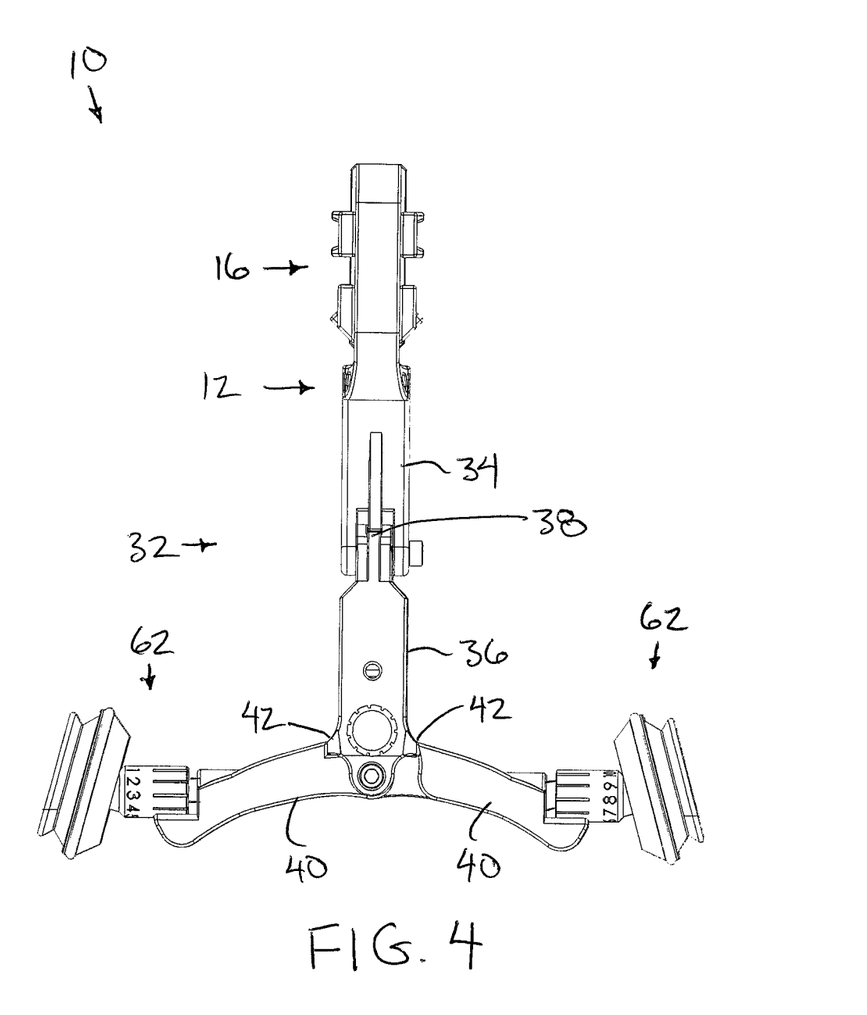
FIG. 4 is an end elevational view of the camera supporting assembly in the dolly mode.

In a stabilizer mode of operation as shown in FIG. 2, stabilizer weights 44 are provided which are threadably secured into respective sockets 46 located in the outer ends of all of the foot portions 40 respectively. In this instance, the camera supporting assembly 10 is used with a grip member 50 having a handle portion arranged to be gripped in a hand of a user opposite a first pivot coupling 52 located at the opposing end of the grip member.

The frame includes a second pivot coupling 54 below the mounting channel 14 to be laterally centered between the leg assemblies 32 generally in proximity to the camera mount thereabove. The first and second pivot couplings are arranged to pivotally mate with one another to define a pivotal connection between the grip member and the frame 12 which functions as a balancing point for the stabilizer function of the camera supporting assembly 10. In this instance, the leg assemblies 32 extend downwardly below the pivotal connection to provide the function of stabilizer legs in which the stabilizer weights 44 below the pivotal connection counterbalance a camera supported on the camera mount above the pivotal connection.

The grip member 50 may also include a steering function by providing a first magnetic coupling 56 on the grip member spaced radially outward from a vertical steering axis of the pivotal connection. The first magnetic coupling 56 is magnetically attracted to a second magnetic coupling 58 located on the frame in proximity to the second pivot coupling 54. Two third magnets 60 are mounted at laterally opposing sides of the second magnetic coupling 58 which are arranged to magnetically repel the first magnet to maintain the first magnet generally centered between the two third magnets 60 in closer proximity to the second magnet 58. The magnetic interaction of the magnets provides a steering function as rotating the handle about a vertical steering axis extending through the pivotal connection causes the frame to follow a similar steering movement about the vertical steering axis.

In the alternative dolly mode of operation, the stabilizer weights 44 are readily removed using the threaded connection to the foot portions 40 respectively such that a plurality of wheel assemblies 62 can be attached to the foot portions 40 interchangeably in place of the weights 44. In the dolly mode, all four sockets 46 at the ends of the two foot portions of each of the two leg assemblies is provided with one of the wheel assemblies 62 threadably secured therein.

Figure 9:
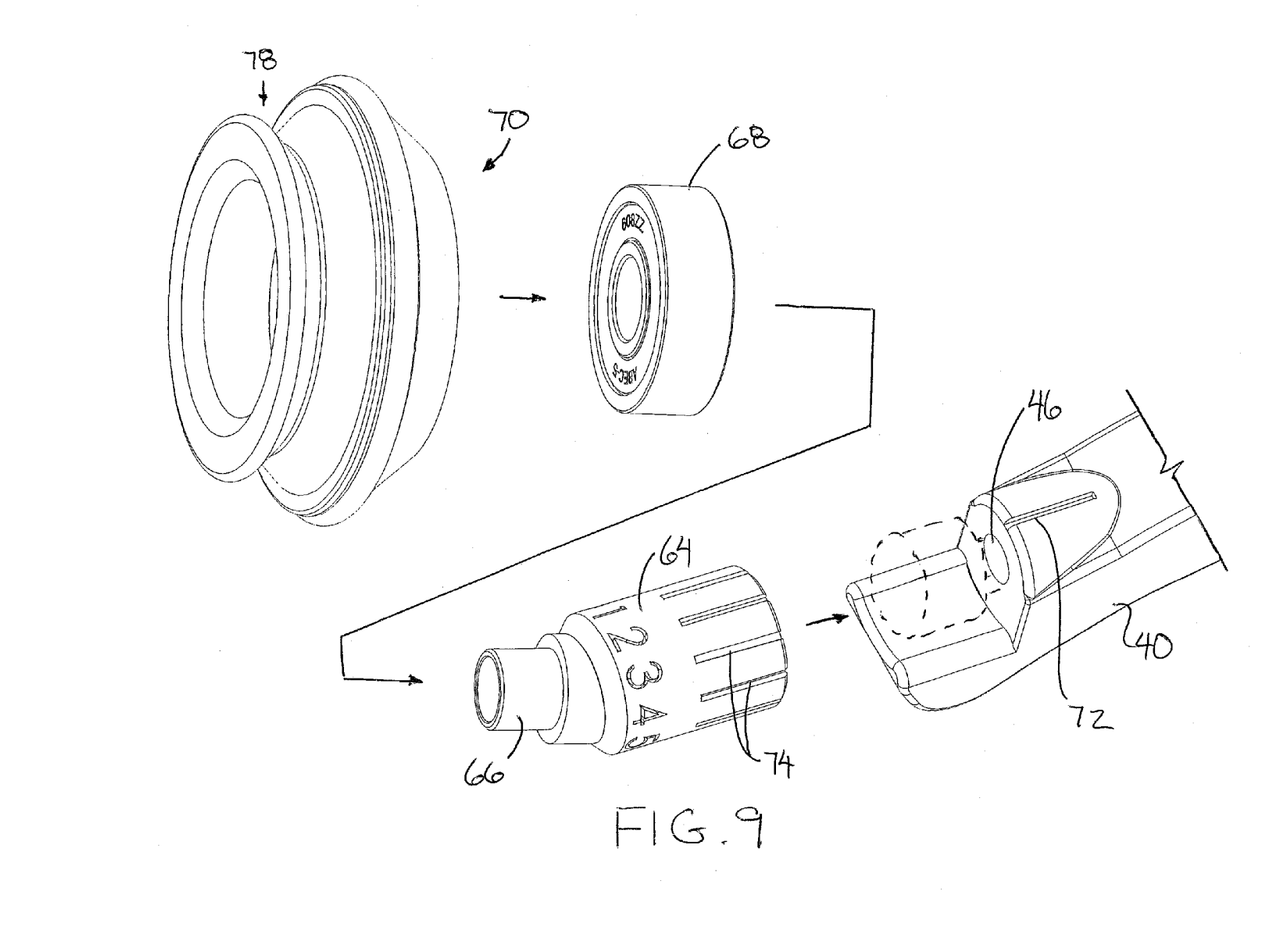
FIG. 9 is an exploded perspective view of one of the wheel assemblies.
Figure 10:
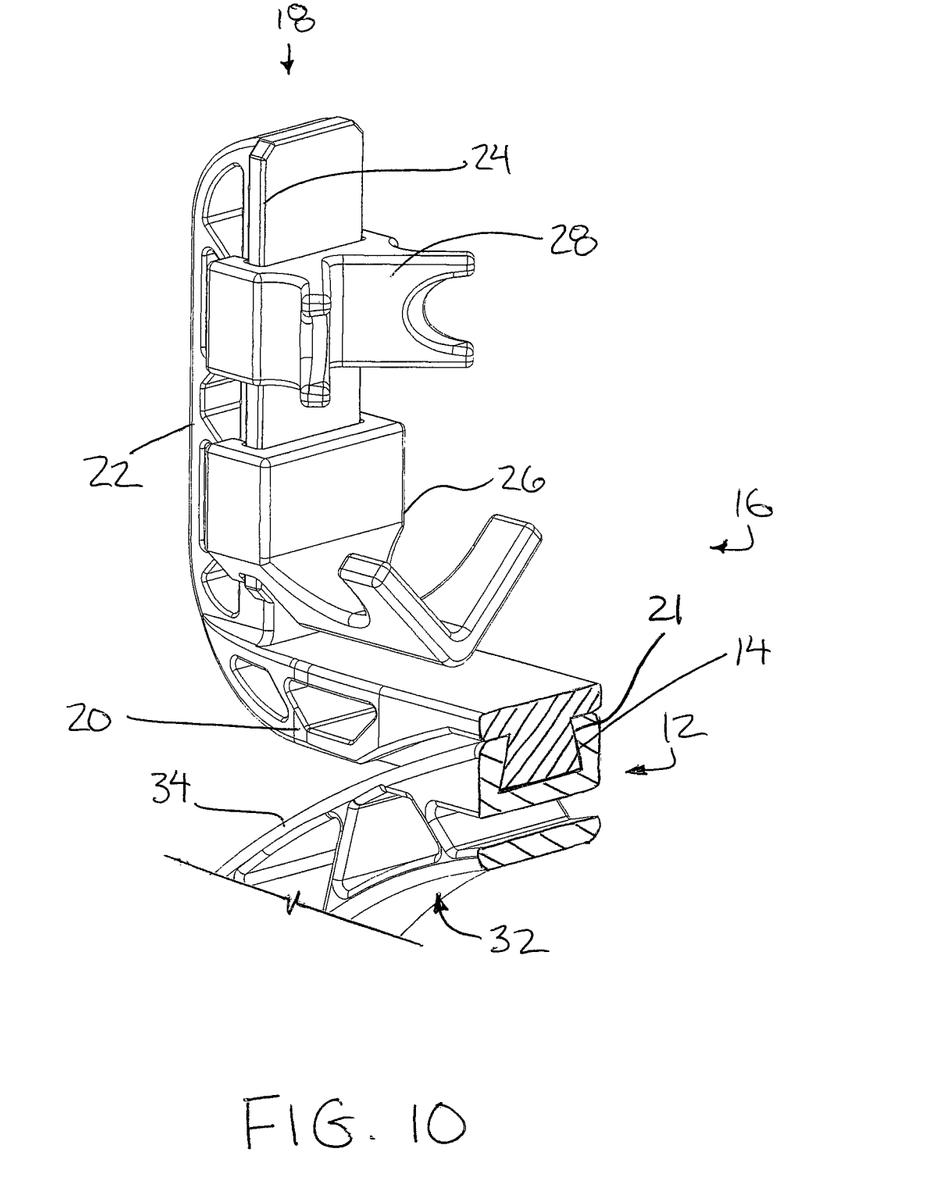
FIG. 10 is a perspective view of a cross section taken along the line 10-10 of FIG. 3.

Each wheel assembly comprises a suitable lug which is threaded into the respective socket 46 onto which a respective spindle of the wheel assembly is mounted. The spindle includes a mounting body 64 which fits frictionally onto the lug to be rotatable together with the lug relative to the frame between a plurality of different mounted positions due to the threaded connection of the lug into the socket 46. The mounting body is retained in each of the different mounting positions by friction between the lug and the threaded socket 46 in the foot portion of the frame. However, in alternative embodiments, particularly for larger cameras, the mounting body may be more positively clamped or threadably secured in each one of the defined mounted positions relative to the frame. The mounting body is generally rotated about a respective adjustment axis between the different mounted positions in which the adjustment axes of all four wheel assemblies correspond to the axes of the threaded sockets 46 which are generally parallel to one another in the working position of the leg assemblies.

Each spindle further comprises a spindle shaft 66 fixed onto the respective mounting body 64 in which the shaft defines a wheel axis of the respective wheel assembly. A suitable rotary bearing 68 is mounted about the shaft 66 which in turn supports a wheel 70 thereon for rotation about the wheel axis defined by the shaft. The shaft is angularly offset relative to the mounting body such that the resulting wheel axis is transverse to, non-parallel to, or angularly offset relative to the respective adjustment axis of the spindle connection to the frame. In this instance, rotating the mounting body between the different mounted positions about the respective adjustment axis relative to the frame positions the wheel axis of the wheel assembly at a corresponding plurality of different angular orientations relative to the frame.

Figure 1:
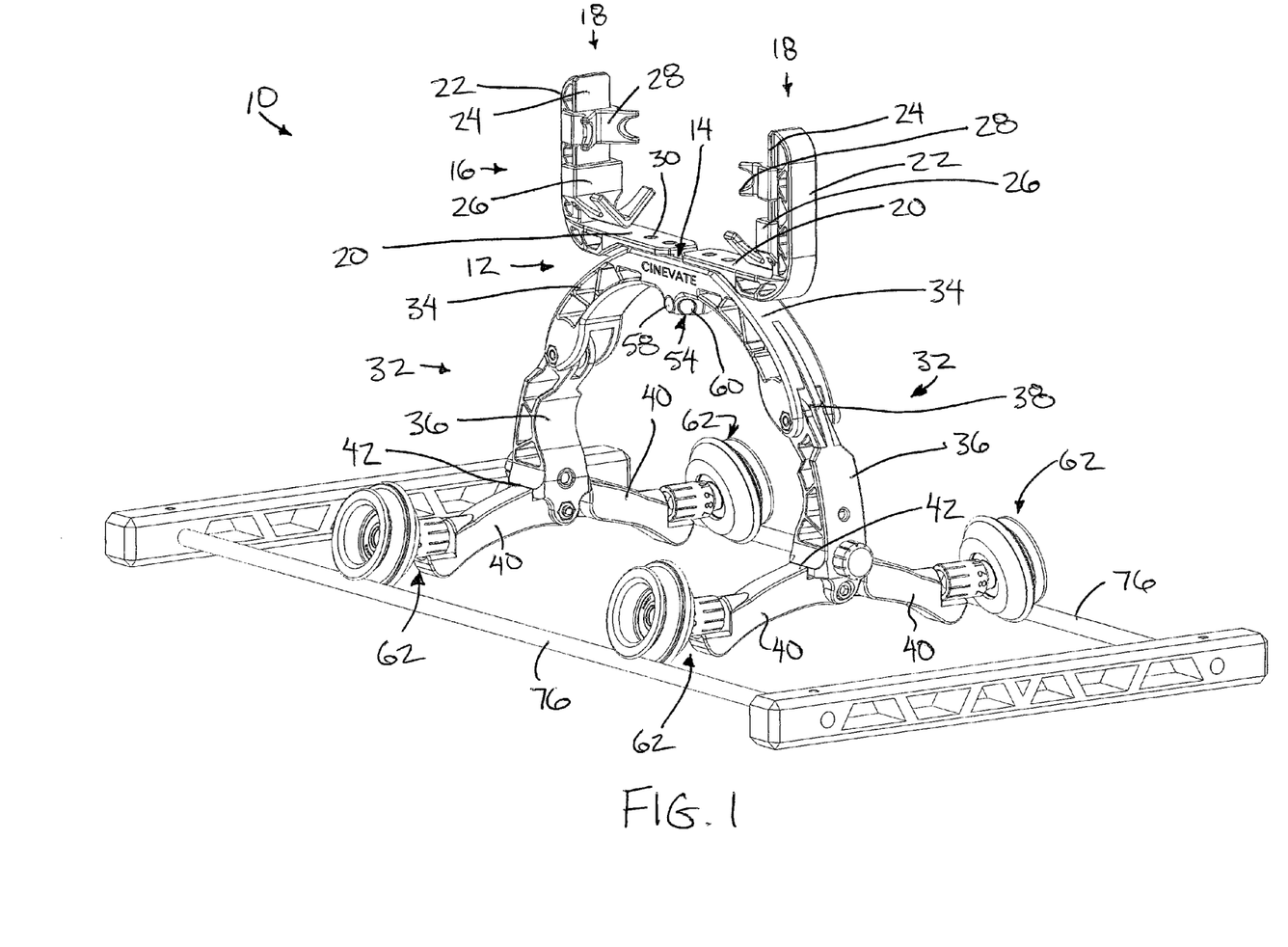
FIG. 1 is perspective view of the camera supporting assembly in a dolly mode using a track.

Furthermore, due to the threaded connection of the lugs within the respective sockets 46, rotating the mounting bodies 64 relative to the sockets results in the space between the two mounting bodies of each leg assembly being adjustable relative to one another. This is particularly useful when aligning the wheels with a particular configuration of track as shown in FIG. 1.

Figure 7:
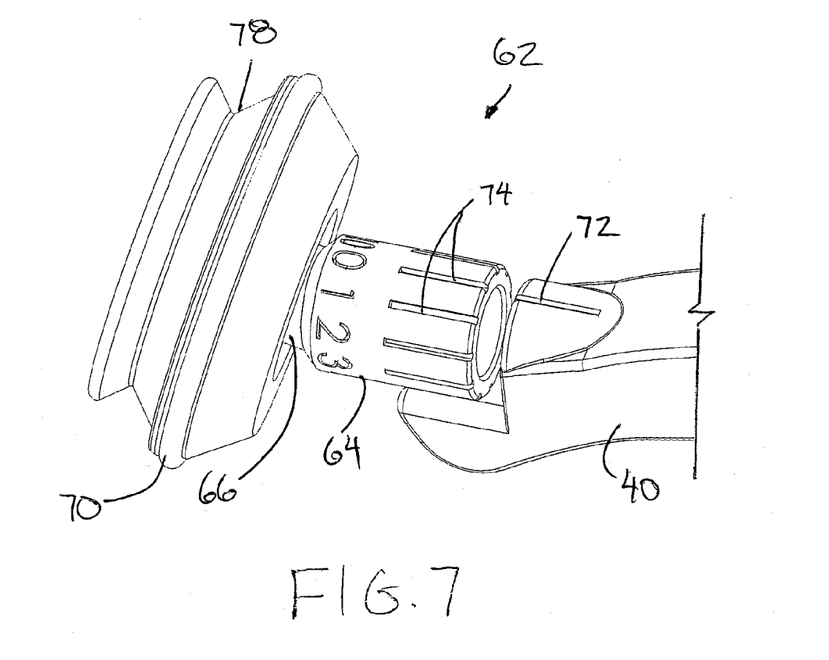
FIG. 7 is a perspective view of one of the wheel assemblies in a first mounted position relative to the frame corresponding to a first angular orientation of the spindle.
Figure 8:
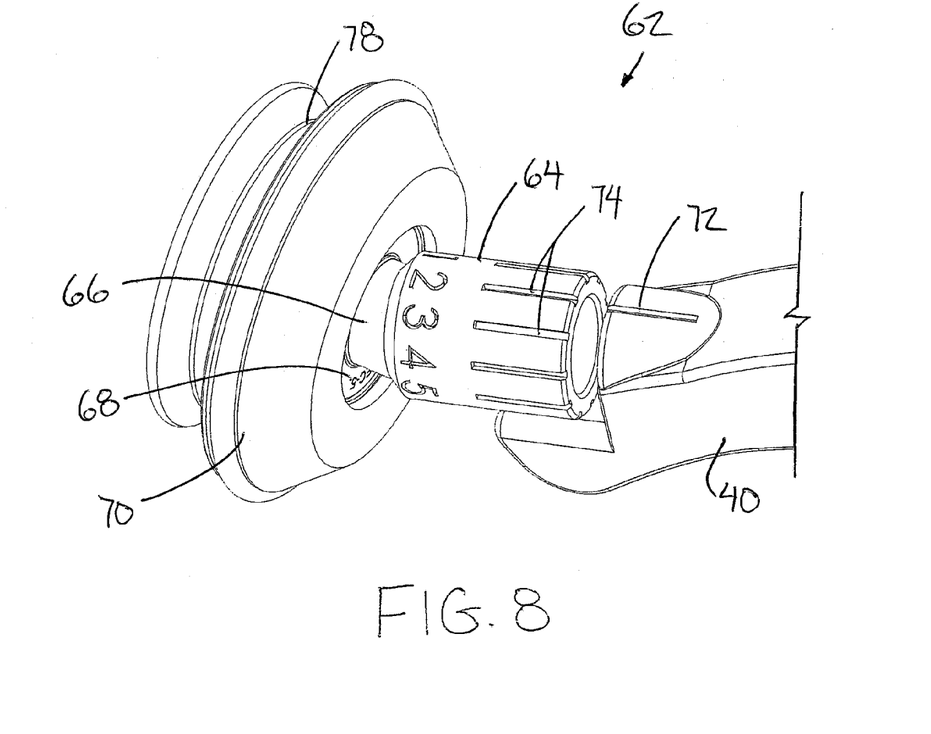
FIG. 8 is a perspective view of the wheel assembly of FIG. 7 is a second mounted position relative to the frame corresponding to a second angular orientation of the spindle which is different than the first angular orientation of FIG. 7.

A primary index marker 72 is provided on each foot portion 40 of the frame in proximity to the respective mounting body 64 of the associated wheel assembly. Cooperating secondary index markers 74 are provided on the mounting body of each wheel assembly at circumferentially spaced positions thereon about the adjustment axis such that in each mounted position of the spindle relative to the frame, a different one of the secondary markers is arranged to be aligned with the primary index marker of the frame to indicate the corresponding angular offset of the wheel axis relative to the frame. In this instance, the angular offsets of the different wheel axes can be set to a predictable and reproducible orientation which defines a corresponding prescribed path that the dolly will follow for repeatedly capturing video sequences as desired.

Figure 5:
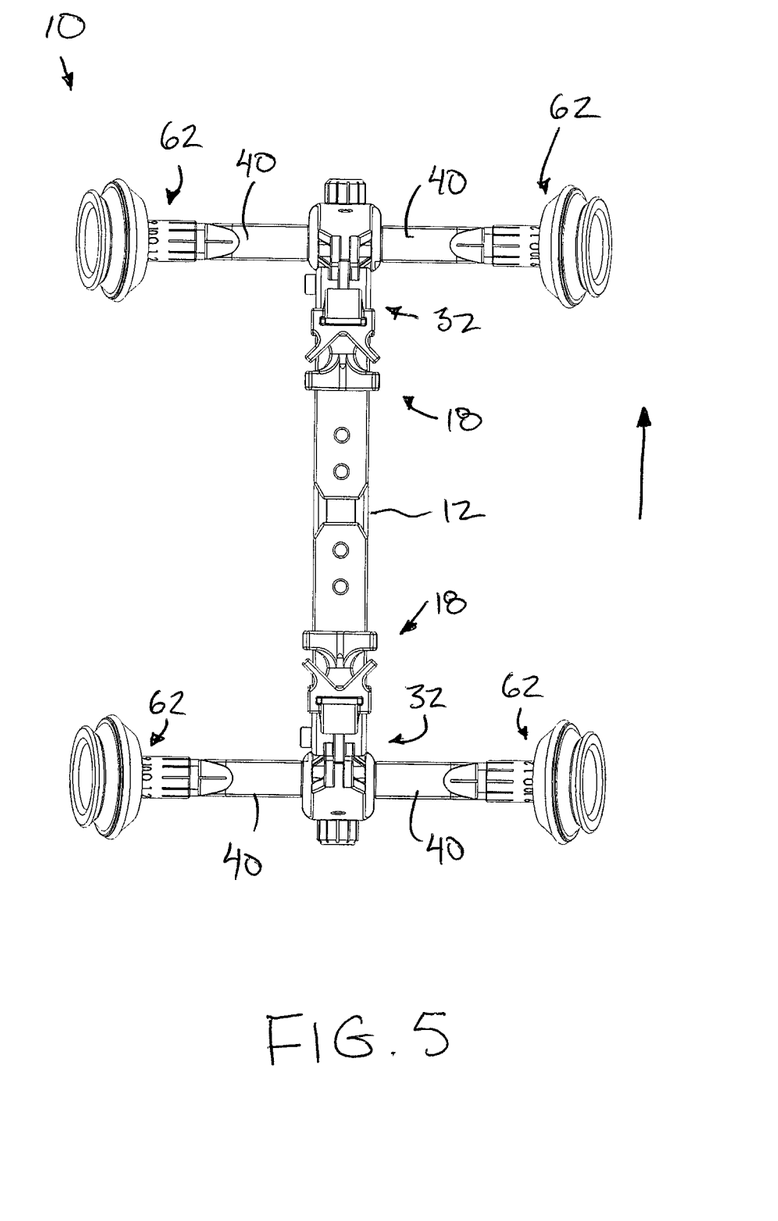
FIG. 5 is a top plan view of the camera supporting assembly in the dolly mode with the wheels oriented for following a linear path.

As shown in FIG. 5, when all of the wheel assemblies are indexed to a common setting, the wheels can be arranged to all be commonly rotating or rolling on a common surface in a linear direction corresponding to the lateral direction of the frame for a panning shot.

Figure 6:
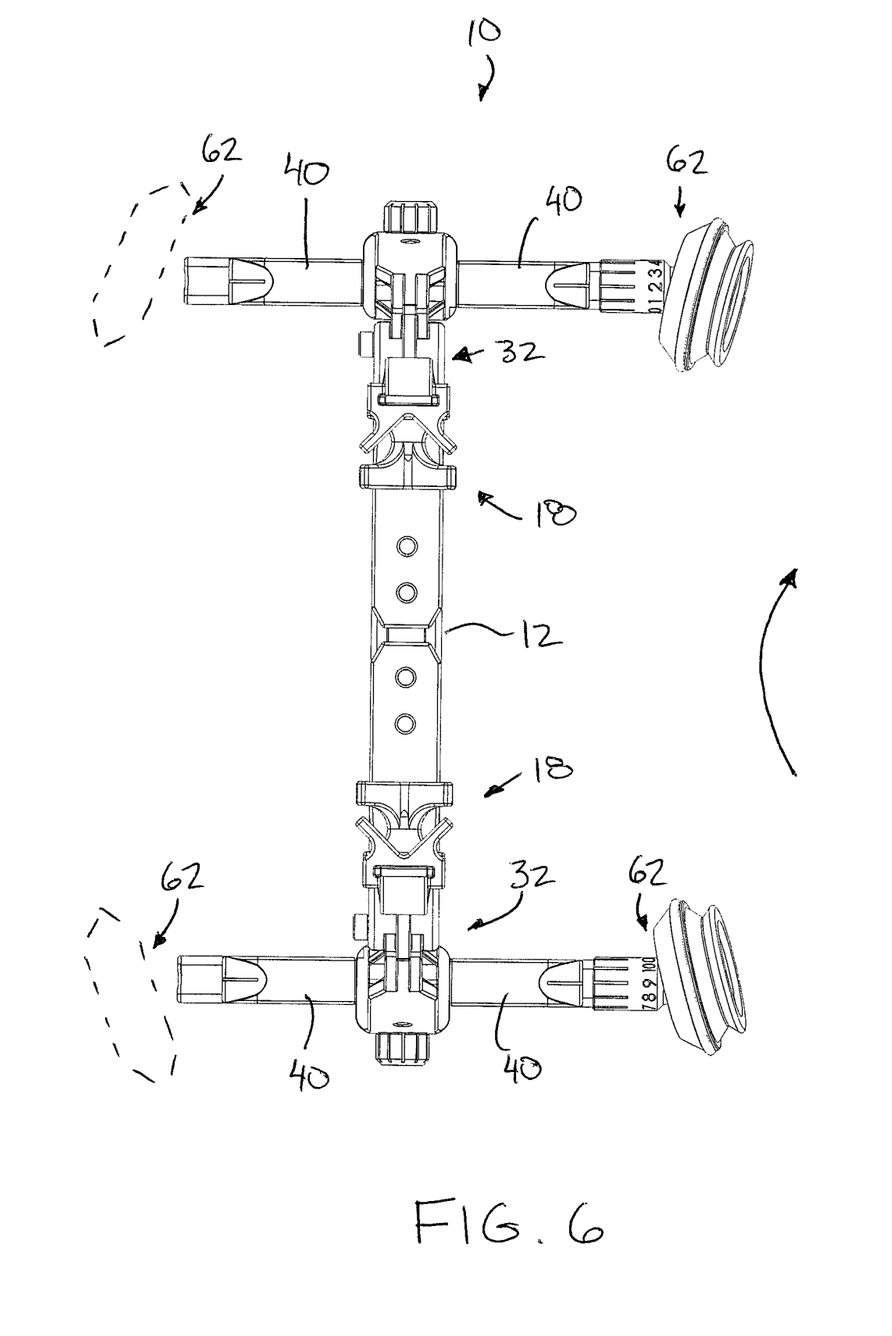
FIG. 6 is a top plan view of the camera supporting assembly in the dolly mode with the wheels oriented for following a curved path.

Alternatively as shown in FIG. 6, by offsetting the wheel assemblies at different angular orientations, the dolly can be set to follow a prescribed curved path along the supporting surface even without a track being provided. Again, the wheels are oriented to generally rotate in a panning direction of the camera device.

In some instances, in the dolly mode, the camera supporting assembly 10 may be used in combination with a track comprising two track members 76 which are mounted parallel and spaced apart. When the track members comprise rods, each of the wheels may be provided with a groove 78 about the periphery thereof in which the grooves are arranged to mate with respective ones of the track members 76 to guide the rolling movement of the camera supporting assembly and camera device supported thereon.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A camera supporting assembly for supporting a camera device for rolling movement along a supporting surface, the camera supporting assembly comprising:
   a frame;
   a camera mount supported on the frame and arranged to support the camera device thereon;
   a plurality of wheel assemblies supported on the frame below the camera mount, each wheel assembly comprising:
      a spindle mounted on the frame and defining a wheel axis; and
      a wheel supported on the spindle rotatably about the wheel axis so as to be so as to be arranged for rolling movement along the supporting surface;
   wherein at least one of the wheel assemblies comprises an adjustable assembly in which the spindle is movable relative to the frame between a plurality of different mounted positions, each corresponding to a different angular orientation of the wheel axis relative to the frame.

2. The camera supporting assembly according to claim 1 wherein each of the wheel assemblies comprises an adjustable assembly in which the spindle thereof is movable relative to the frame between a plurality of different mounted positions having different angular orientations of the wheel axis thereof relative to the frame.

3. The camera supporting assembly according to claim 1 in combination with a camera device supported on the camera mount wherein the wheels are oriented for rolling movement generally in a panning direction relative to the camera device.

4. The camera supporting assembly according to claim 1 in combination with a camera device supported on the camera mount wherein the camera device comprising a camera enabled mobile phone.

5. The camera supporting assembly according to claim 1 wherein the spindle of the adjustable assembly of said at least one of the wheel assemblies is rotatable relative to the frame between the different mounted positions about a respective adjustment axis which is transverse to the respective wheel axis.

6. The camera supporting assembly according to claim 1 wherein there are provided co-operating indexing markings on the frame and on said at least one wheel assembly which are arranged to be aligned with one another in each of the different mounted positions.

7. The camera supporting assembly according to claim 1 wherein a plurality of the wheel assemblies comprise adjustable wheel assemblies, each being rotatable relative to the frame between respective different mounted positions about a respective adjustment axis which is transverse to the respective wheel axis, the adjustment axes being parallel to one another.

8. The camera supporting assembly according to claim 1 further comprising:
a grip member including a handle arranged to be gripped in a hand of a user and a first pivot coupling;
a second pivot coupling supported on the frame and arranged to be pivotally coupled to the first pivot coupling on the grip member so as to define a pivotal connection between the first and second pivot couplings; and
at least one leg assembly mounted on the frame to extend downwardly below the second pivot coupling of the frame so as to be arranged to counterbalance a camera device supported on the camera mount about said pivotal connection;
wherein the wheel assemblies are mounted on said at least one leg assembly.

9. The camera supporting assembly according to claim 1 wherein the frame comprises a pair of leg assemblies extending downwardly from the camera mount, each leg assembly supporting a pair of the wheel assemblies thereon.

10. The camera supporting assembly according to claim 9 wherein each of the leg assemblies includes an upper portion, a lower portion which is pivotally foldable relative to the upper portion between a folded storage position adjacent the upper portion and an extended working position extending downwardly from the upper portion, and a stop member which prevents pivoting movement of the lower portion relative to the upper portion beyond the extended working position from the folded storage position.

11. The camera supporting assembly according to claim 9 further comprising a pair of foot portions supported at a bottom end of each leg assembly at opposing sides of the leg assembly, the pair of wheel assemblies being supported on the pair of foot portions respectively.

12. The camera supporting assembly according to claim 11 wherein the foot portions are pivotal relative to the leg assembly between a storage position adjacent one another and a working position extending outwardly in opposing directions from the opposing sides of the leg assembly, and wherein there is provided a stop member which prevents pivoting movement of each foot portion relative to the leg assembly beyond the working position from the storage position.

13. The camera supporting assembly according to claim 9 further comprising:
a grip member including a handle arranged to be gripped in a hand of a user and a first pivot coupling; and
a second pivot coupling supported on the frame and arranged to be pivotally coupled to the first pivot coupling on the grip member so as to define a pivotal connection between the first and second pivot couplings;
wherein the pair of leg assemblies supporting the wheel assemblies thereon are mounted on the frame to extend downwardly below the second pivot coupling of the frame so as to be arranged to counterbalance a camera device supported on the camera mount about said pivotal connection.

14. The camera supporting assembly according to claim 13 wherein the wheel assemblies are readily separable from the leg assemblies and wherein the camera supporting assembly further comprises a plurality of stabilizer weights which are arranged to be mounted on the frame interchangeably with the wheel assemblies.

15. The camera supporting assembly according to claim 1 in combination with a pair of track members wherein each of the wheels comprises a groove extending about a periphery thereof which arranged to mate with a respective one of the track members.

16. The camera supporting assembly according to claim 1 wherein the camera mount is readily separable from the frame and wherein the camera supporting assembly further comprises an auxiliary mount which is arranged to be mounted on the frame interchangeably with the camera mount, one of the auxiliary mount and the camera mount being arranged to support a camera enabled smartphone thereon and another one of the auxiliary mount and the camera mount being arranged to support a different configuration of camera device thereon.

17. The camera supporting assembly according to claim 16 wherein the frame includes a first mating component thereon and both the camera mount and the auxiliary mount include a respective second mating component thereon, each second mating component being arranged to mate with the first mating component so that the corresponding mount is linearly slidable relative to the frame for attachment and removal of the mount from the frame respectively.

18. A camera supporting assembly for balancing a camera thereon, the camera supporting assembly comprising:
a frame;
a camera mount supported on the frame and arranged to support the camera device thereon;
a grip member including a handle arranged to be gripped in a hand of a user and a first pivot coupling;
a second pivot coupling supported on the frame and arranged to be pivotally coupled to the first pivot coupling on the grip member so as to define a pivotal connection between the first and second pivot couplings;
at least one stabilizer leg assembly mounted on the frame to extend downwardly below the second pivot coupling of the frame so as to be arranged to counterbalance a camera device supported on the camera mount about said pivotal connection;
a plurality of wheel assemblies supported on said at least one stabilizer leg assembly of the frame, each wheel assembly comprising a wheel supported on the stabilizer leg assembly of the frame for rotation about a respective wheel axle so as to be so as to be arranged for rolling movement along a supporting surface.

19. A camera supporting assembly for balancing a camera thereon, the camera supporting assembly comprising:
a frame;
a camera mount supported on the frame and arranged to support the camera device thereon;
a grip member including a handle arranged to be gripped in a hand of a user and a first pivot coupling;
a second pivot coupling supported on the frame and arranged to be pivotally coupled to the first pivot coupling on the grip member so as to define a pivotal connection between the first and second pivot couplings; and at least one stabilizer leg assembly mounted on the frame to extend downwardly below the second pivot coupling of the frame so as to be arranged to counterbalance a camera device supported on the camera mount about said pivotal connection;

wherein the camera mount is readily separable from the frame; and wherein the camera supporting assembly further comprises an auxiliary mount which is arranged to be mounted on the frame interchangeably with the camera mount;

one of the auxiliary mount and the camera mount being arranged to support a camera enabled smartphone thereon and another one of the auxiliary mount and the camera mount being arranged to support a different configuration of camera device thereon.

20. The camera supporting assembly according to claim 19 wherein the frame includes a first mating component thereon and both the camera mount and the auxiliary mount include a respective second mating component thereon, each second mating component being arranged to mate with the first mating component so that the corresponding mount is linearly slidable relative to the frame for attachment and removal of the mount from the frame respectively.

* * * * *